(12) United States Patent
de la Torre et al.

(10) Patent No.: US 11,243,150 B2
(45) Date of Patent: Feb. 8, 2022

(54) SHEAR TESTER

(71) Applicant: Design West Technologies, Inc., Tustin, CA (US)

(72) Inventors: Sam de la Torre, Riverside, CA (US); Ryan Hur, Irvine, CA (US)

(73) Assignee: Design West Technologies, Inc., Tustin, CA (US)

( * ) Notice: Subject to any disclaimer, the term of this patent is extended or adjusted under 35 U.S.C. 154(b) by 169 days.

(21) Appl. No.: 16/794,018

(22) Filed: Feb. 18, 2020

(65) Prior Publication Data

US 2020/0264080 A1    Aug. 20, 2020

Related U.S. Application Data

(60) Provisional application No. 62/807,193, filed on Feb. 18, 2019.

(51) Int. Cl.
*G01N 3/02*    (2006.01)
*G01N 3/24*    (2006.01)
*G01N 19/04*   (2006.01)

(52) U.S. Cl.
CPC ............... *G01N 3/02* (2013.01); *G01N 3/24* (2013.01); *G01N 19/04* (2013.01); *G01N 2203/0025* (2013.01); *G01N 2203/0091* (2013.01)

(58) Field of Classification Search
CPC .... G01N 3/02; G01N 3/24; G01N 2203/0025; G01N 2203/0091; G01N 19/04
USPC ............................................. 73/150 A, 150 R
See application file for complete search history.

*Primary Examiner* — Jonathan M Dunlap
(74) *Attorney, Agent, or Firm* — Inskeep IP Group, Inc.

(57) ABSTRACT

A portable shear testing device includes a shear force unit that has two elongated jaw members that are positioned adjacent to each other. One of the jaw members can be moved away from the other, stationary jaw member. One of the jaw members is moved by a pivotally mounted lever that laterally moves a load transfer block connected to the jaw member. A digital load cell is positioned between the lever and the load transfer block and a threaded knob is rotated to press against the lever.

18 Claims, 10 Drawing Sheets

SHEAR TESTER

RELATED APPLICATIONS

This application claims priority to U.S. Provisional Application Ser. No. 62/807,193 filed Feb. 18, 2019 entitled Shear Tester, which is hereby incorporated herein by reference in its entirety.

BACKGROUND OF THE INVENTION

Shear test machines are used to evaluate the shear strength or maximum shear stress of one or more materials. Typically, a shear test involves applying force to two different surfaces of a material and in opposite directions so that the material is stressed in a sliding motion. Commonly, materials such as metal, plastic, ceramic, composite substrates, adhesives, layered composites, and glued assemblies are tested.

In some applications, such as confirming proper adhesion of tile panels to underlying structural components (e.g., aluminum-to-aluminum or aluminum-to-composite via epoxy), a portable shear testing device is desirable. However, current portable shear testing devices can be difficult to use for such purposes because they rely on pneumatic pressure sensors that require cross reference sheets to interpret readings. Additionally, current portable shear testing devices typically have multiple moving parts and relatively high internal friction which can reduce the accuracy of measurements.

Therefore, an improved design that overcomes the disadvantages of the current portable shear testers would be valuable.

SUMMARY OF THE INVENTION

The present invention is directed to a portable shear testing device. In one embodiment, the device includes a shear force unit that has two elongated jaw members that are positioned adjacent to each other. One of the jaw members can be moved away from the other, stationary jaw member.

In one embodiment, one of the jaw members is moved by a pivotally mounted lever that laterally moves a load transfer block connected to the jaw member. In one embodiment, a digital load cell is positioned between the lever and the load transfer block. In one embodiment, a threaded knob is rotated to press against the lever.

Another embodiment of the present invention includes a drill guide that fits within a support baseplate. The baseplate can have a key portion that engages a key portion on the drill guide. The drill guide may include a drill shaft with a drill bit that is configured to cut a circular groove.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In that respect, elements and functionality of one embodiment not necessarily only limited to that embodiment and may be combined with other embodiments shown herein in any manner that would result in a functional embodiment. The terminology used in the detailed description of the embodiments illustrated in the accompanying drawings is not intended to be limiting of the invention. In the drawings, like numbers refer to like elements, including between different embodiments.

Figure 1:
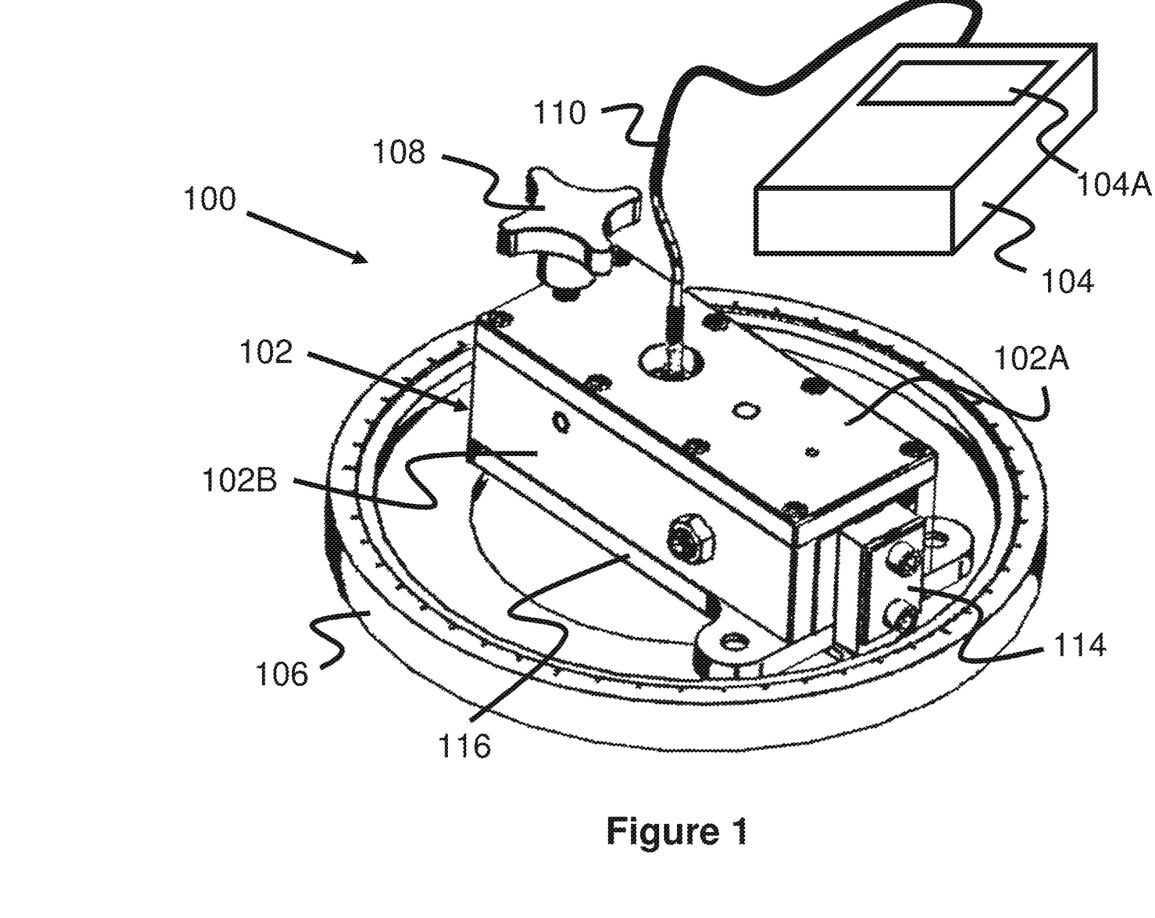
FIG. 1 illustrates a perspective view of a shear testing device according to the present invention.

FIG. 1 illustrates a perspective view of a portable shear testing device 100 according to the present invention. As described in greater detail below, the shear force unit 102 can be actuated by the user to apply force via a set of jaws on its lower portion. This force can then be measured by a pressure gauge 104 that has a pressure sensor within the shear force unit 102, thereby providing the user with the amount of shear force being applied to one or more materials via the jaws.

Figure 3:
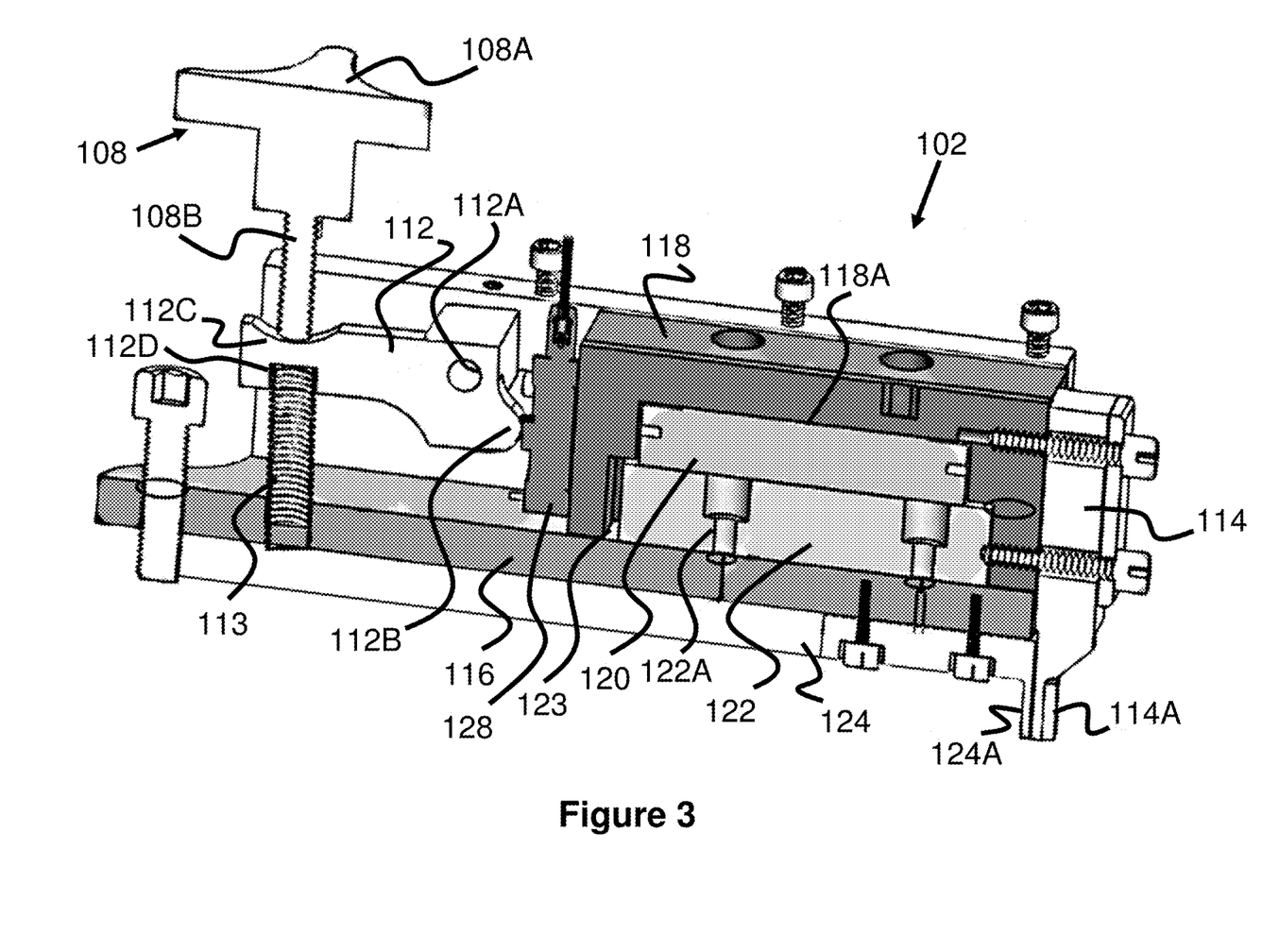
FIG. 3 illustrates a cross sectional view of the shear force unit of FIG. 2 according to the present invention.
Figure 4:
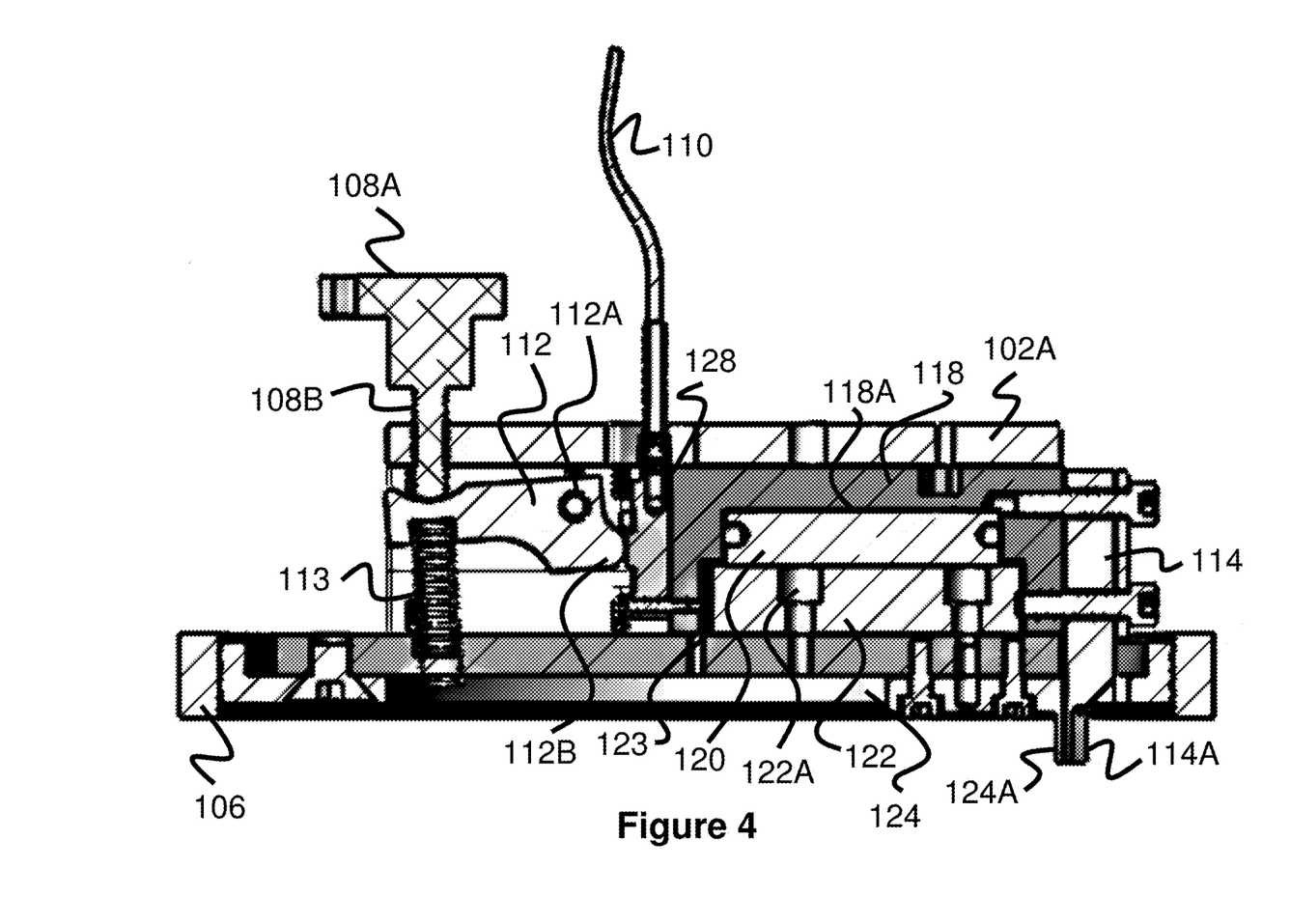
FIG. 4 illustrates a cross sectional view of the shear force unit of FIG. 2 according to the present invention.
Figure 5:
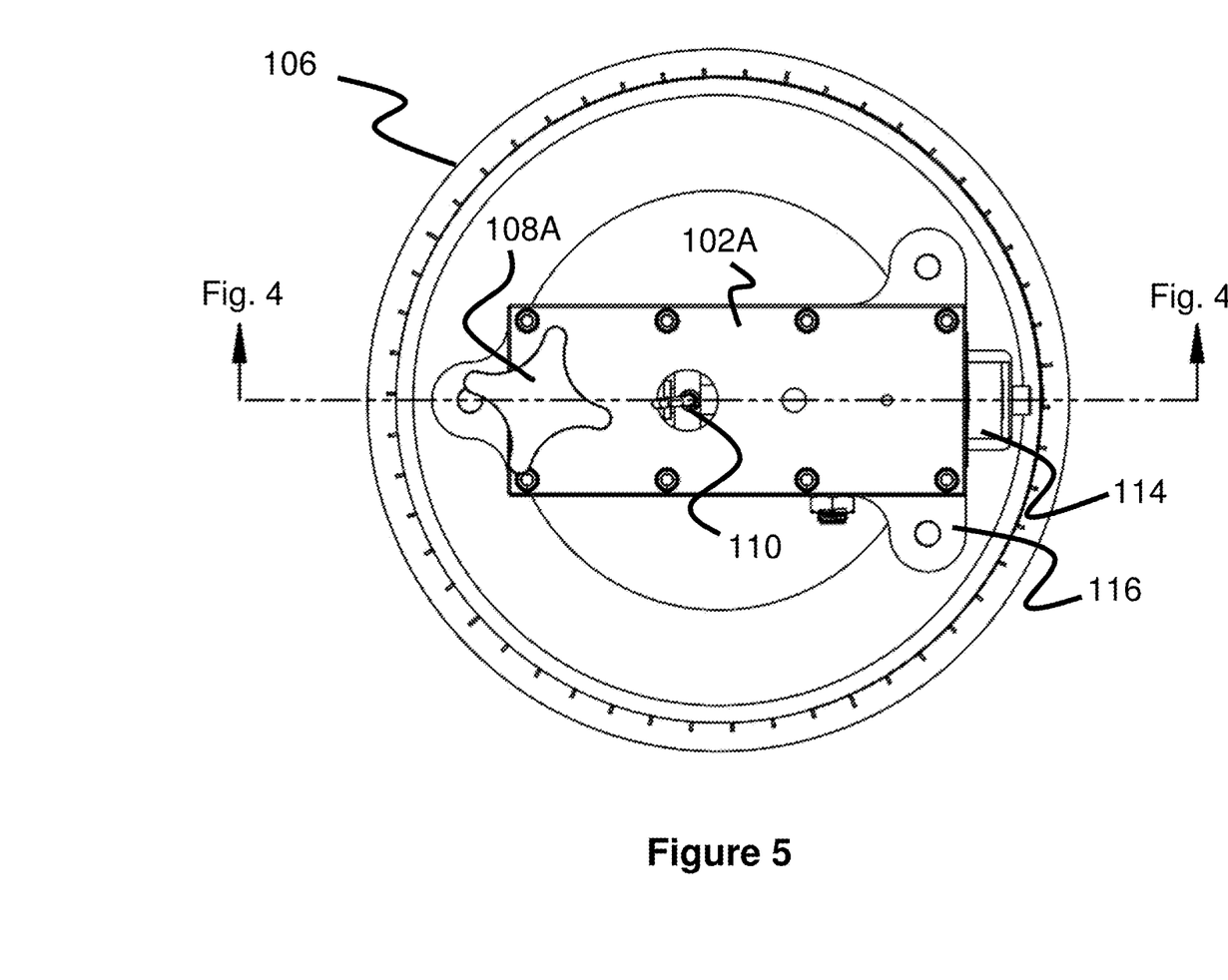
FIG. 5 illustrates a top view of the shear testing device of FIG. 1 according to the present invention.

The internal mechanism of the shear force unit 102 can best be seen in FIGS. 3 and 4. Generally, the input knob 108 moves upwards or downwards when rotated to cause the lever 112 to change positions. Since the lever 112 includes a rounded or curved end 112A, its position change will apply force on the various components on the right-hand side of the figures, thereby moving the elongated jaw member 114A away from the stationary, elongated jaw member 124A. In that respect, the jaw members 114A, 124A can be positioned against various surfaces of material to test their shear strength.

The input knob 108 is composed of a hand grip portion 108A that is suitable for a user to grasp with their hands and an elongated threaded portion 108A extending downward from the hand grip portion 108A. In one embodiment the threaded portion 108A engages and mates with a thread through an aperture in the top panel 102A. Hence, rotating the input knob 108 moves the threaded portion 108A relative to the top panel 102A, into and out of the shear force unit 102. Other mechanisms can also be used instead of a threaded knob arrangement, such as an extended lever with a hand grip portion or a motor.

In one embodiment, the lever 112 is pivotally mounted to the side panels 102B of the unit 102 through aperture 112A, which allows the lever 112 to at least partially pivot or rotate. The left-most area of the lever includes a top surface 112C that presses against a bottom of the threaded portion 108B of the input knob 108. A spring 113 is fixed within a depression in the bottom panel 116 and a depression 112D on the bottom surface of the lever 112. As the knob 108 is screwed downward, it pushes the left side of the lever 112 downwards against the bias of the spring 113. Conversely, when the knob 108 is screwed upwards, it releases pressure on the left side of the lever 112 and allows the bias force of the spring 112 to push the lever 113 upwards. In an alternate embodiment, the knob 108 may be positioned sideways so that it directly screws into the digital load cell 128 and the lever is omitted.

As previously discussed, the lever 112 includes a rounded or curved end surface 112B that extends outward from its right side. As the lever 112 is pushed to various positions, different portions of the surface 112B press upon the digital load cell 128. Preferably, the surface 112B is configured such that the surface 112B will increase force on the digital load cell 128 as knob 108 is downwardly rotated (i.e., the rounded surface 112B extends laterally outward increasingly further as the lever 112 is depressed).

Figure 2:
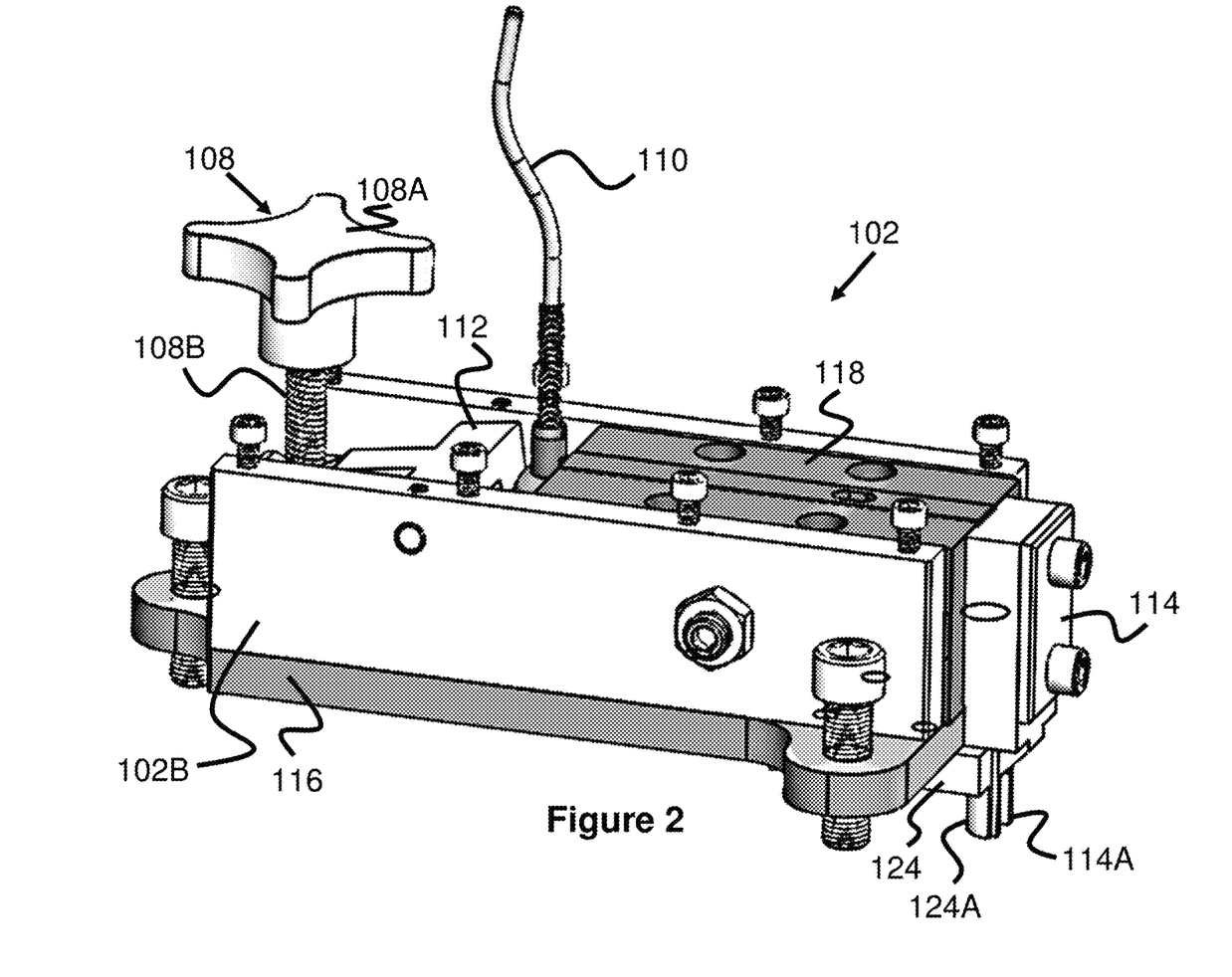
FIG. 2 illustrates a perspective view of a shear force unit according to the present invention.

The digital load cell 128 is a component or housing that includes a transducer that converts force into measurable electrical output. A variety of different types of load cells can be used, such as strain gauge load cells. As best seen in FIGS. 1 and 2, the load cell 128 is connected to the pressure gauge 104 via cable 110 so that it can display the force being applied by the lever 112 in display 104A.

The digital load cell 128 is fixed against one end of the load transfer block 118, which moves laterally (i.e., to the right) when being pushed from the knob 108 and lever 112. The load transfer block 118 includes a cavity 118A within it that contains an upper bearing block 120 and a lower bearing block 122. The upper bearing block 120 is fixed within an upper portion of the cavity 118A so as to move along with the load transfer block 118. The lower bearing block 122 is fixed to the bottom panel 116 and therefore is stationary relative to the load transfer block 118.

Figure 6A:
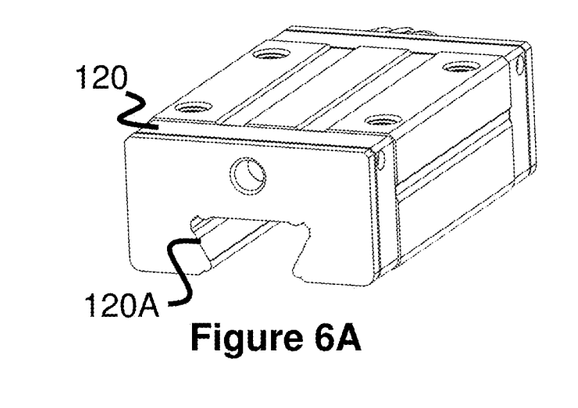
FIG. 6A illustrates a view of an upper bearing block according to the present invention.
Figure 6B:
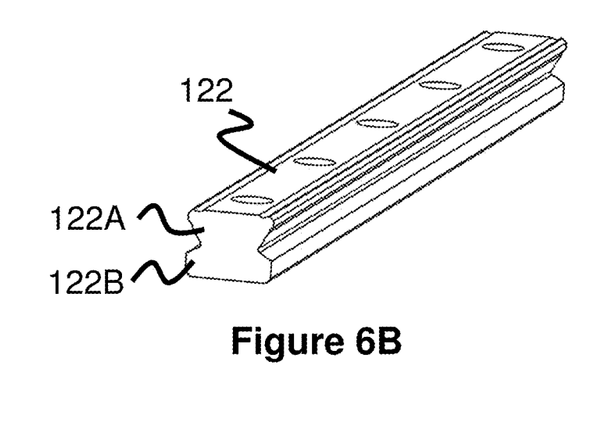
FIG. 6B illustrates a view of a lower bearing block according to the present invention.
Figure 6C:
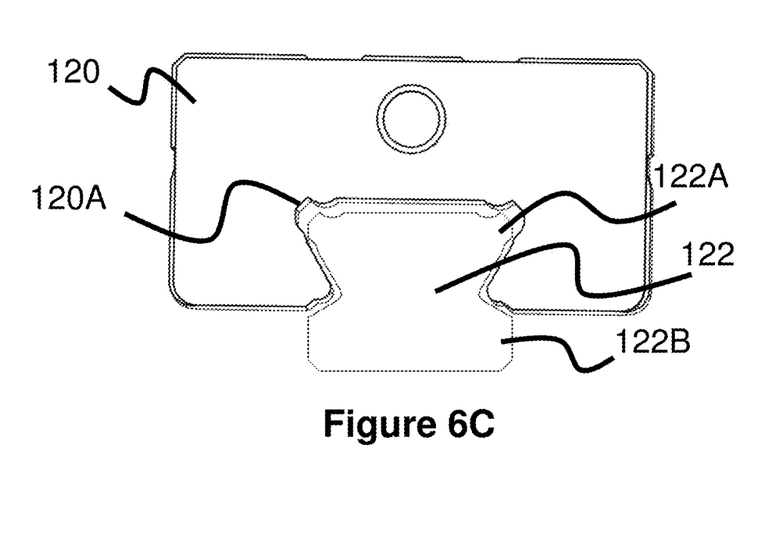
FIG. 6C illustrates a view of both the upper bearing block and the lower bearing block according to the present invention.

The upper bearing block 120 rests on top of the lower bearing block 122 to support the load transfer block 118. FIGS. 6A-6C illustrate one example of an upper bearing block 120 and lower bearing block 122. Specifically, the upper bearing block 120 includes an inner track 120A having inwardly angled sides and a plurality of ball or roller bearings exposed therein. The lower bearing block 122 has a cross sectional shape such that the upper portion fits within the track 120A, while the lower portion extends downward to be mounted to the base plate 116. Hence, the upper bearing block 120 can roll along the lower bearing block 122 with little friction.

When the shear force unit 102 is in its completely closed position, a lower portion of the cavity 118A forms a gap 123 on the left end of the lower bearing block 122. As the load transfer block 118 moves to the right, the lower bearing block 122 remains in its stationary position, causing the gap to decrease in size and the upper bearing block 120 to move over the top surface of the lower bearing block 122. In one embodiment, the gap is about 0.25 inch which also means that the elongated jaw members 114A and 124A only open to about 0.25 inch as well.

An end member 114 is attached to the right end of the load transfer block 118 and has an elongated jaw member 114A that expends downward from its lower portion. When the shear force unit 102 is in an initial, starting position, the elongated jaw member 114A is positioned against the elongated jaw member 124A that extends perpendicularly from the bottom member 124. During operation, the jaw member 114A moves to the right, away from the stationary jaw member 124A to apply shear force to a desired target surface.

In one embodiment, the jaw members 114A and 124A have rounded cross sectional shapes. In another embodiment, the jaw members 114A and 124A have generally flat cross section shapes. In another embodiment, the jaw members 114A and 124A have a cross section that is partially rounded and partially flat (e.g., a "D" shape).

In summary, the shear force unit 102 functions by rotating the knob 108 downward to press downward on the surface 112C of the lever 112. The pivoting lever 112 causes the rounded surface 112B to press against the digital load cell 128 to register a force reading to the pressure gauge 104. The load cell 128, in turn, presses against the load transfer block 118, which is supported by the movable upper bearing block 120 and the stationary lower bearing block 122. As the load transfer block 118 moves to the right, it also moves the attached end member 114 and its elongated jaw member 114A away from the stationary jaw member 124A.

As seen best in FIGS. 1 and 4, the shear force unit 102 can be fixed to a circular bottom support plate 106 that helps maintain a desired position of the unit 102 on the desired target material. Preferably, the support plate 106 includes an aperture that can accommodate the jaw members 114A and 124A.

Figure 10:
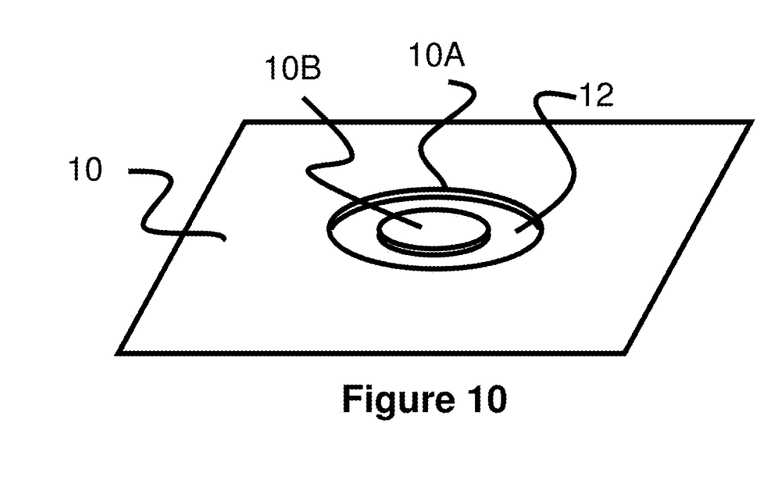
FIG. 10 illustrates a perspective view of a groove cut by a drill guide according to the present invention.

The shear force unit 102 can be used to apply shear force on a variety of surfaces. In one embodiment, those surfaces can be created between two sheets of material (e.g., fixed together with adhesive) by creating circular depression in a material. For example, FIG. 10 illustrates a first sheet of material 10 disposed and adhered to a second sheet of material 12. A circular groove 10A can be cut into the top, first sheet of material 10. The groove 10A forms a circular path around an untouched portion 10B of the first sheet of material 10. In this respect, the stationary jaw member 124A can engage a side surface of the portion 10B while the movable jaw member 114A can engage the side surface of the outer portion of the circular groove 10A.

Figure 7:
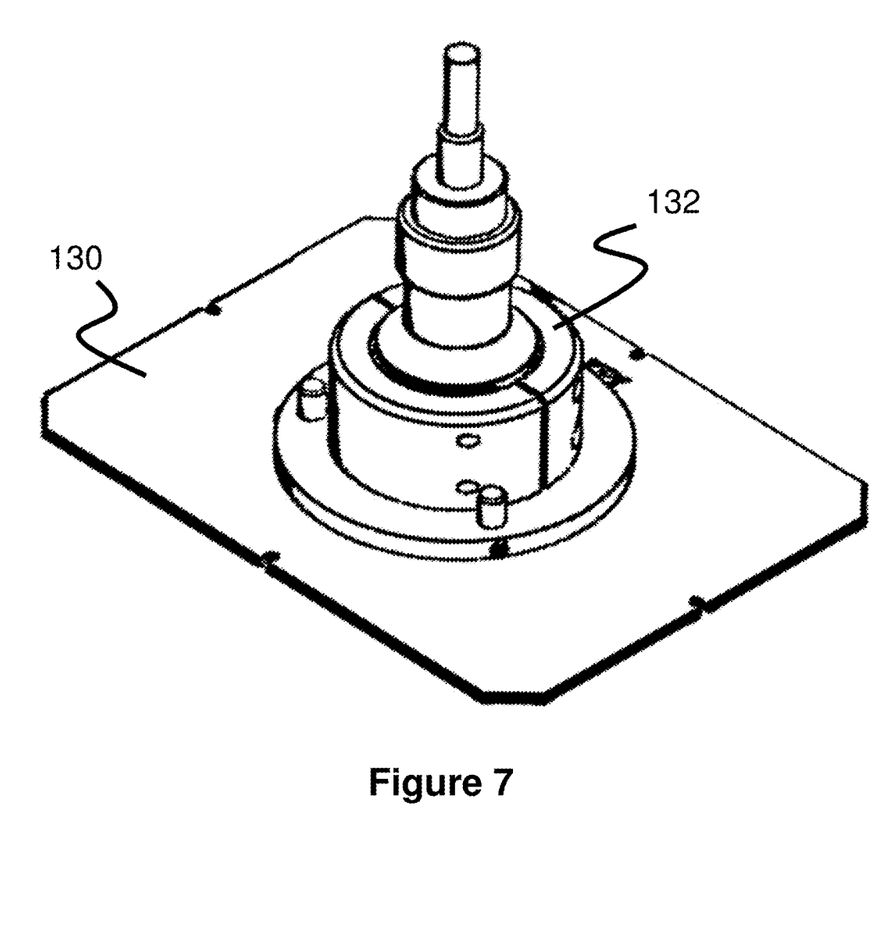
FIG. 7 illustrates a perspective view of a drill guide and baseplate according to the present invention.
Figure 8:
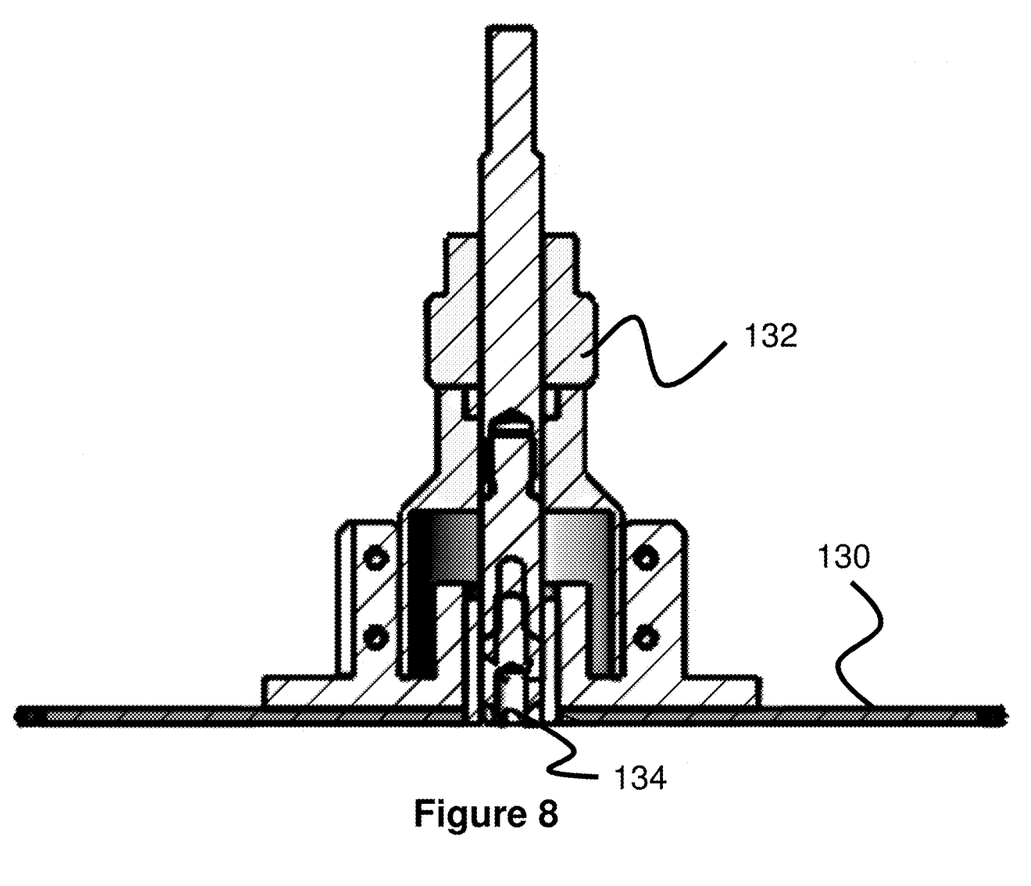
FIG. 8 illustrates a cross sectional view of the drill guide and baseplate of FIG. 6 according to the present invention.
Figure 9:
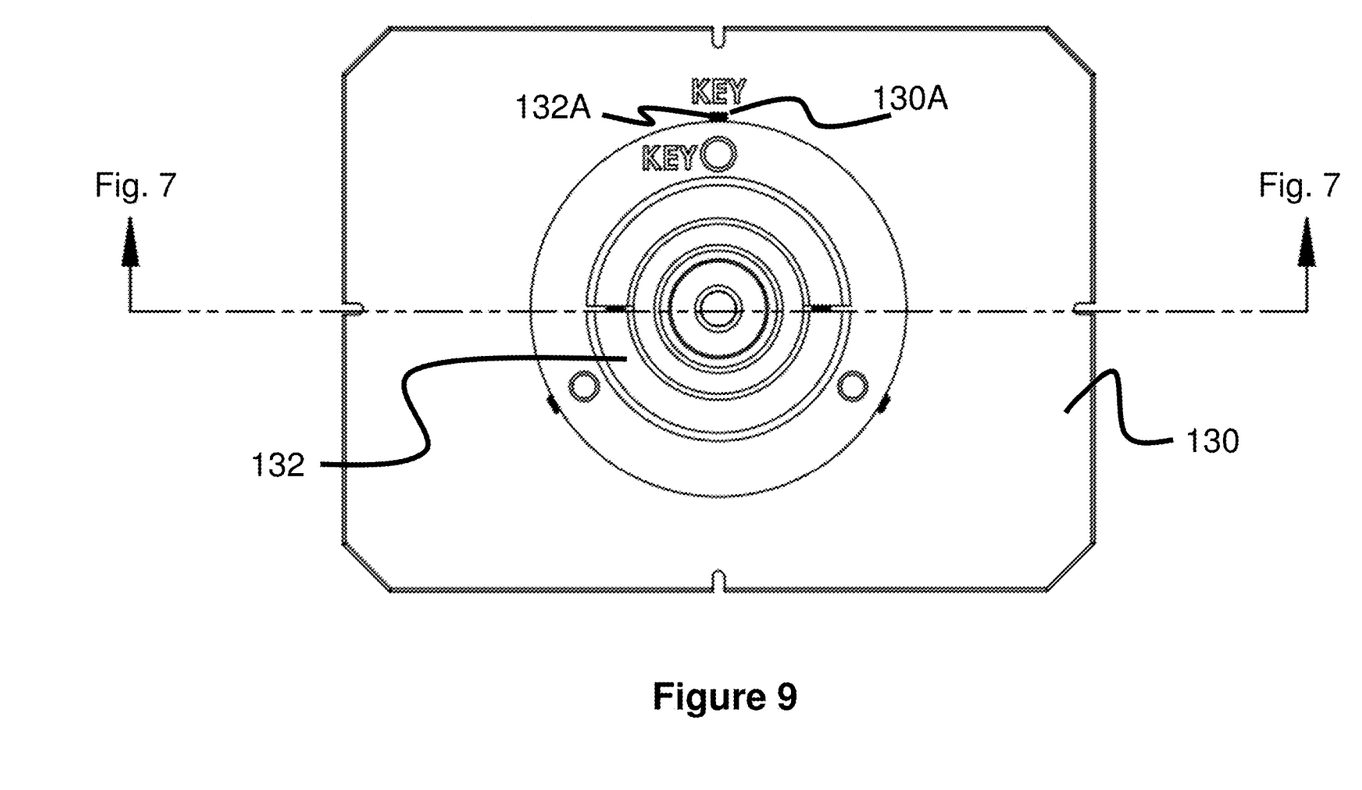
FIG. 9 illustrates a top view of the drill guide and baseplate of FIG. 6 according to the present invention.

The circular groove 10A can be created with a drill bit and guide assembly 132 that fits into the aperture of a baseplate 130, as seen in FIGS. 7-9. As best seen in FIG. 8, the top of the assembly 132 connects to a drill and the surrounding portions act as a guide or support for the drill shaft. The end of the drill shaft includes a circular drill surface 134 that is configured to cut a tubular, circular shape into a material below it. As best seen in FIG. 9, the baseplate 130 includes an aperture having a key portion 130A that engages with a mating key portion 132A of the assembly 132 (e.g., a radially enlarged shape that fits into a mating groove). This allows the user to remove the assembly 132 to check the progress on the cut and replace it in the exact same position to continue cutting, if necessary.

In one method according to the present invention, the baseplate 130 is placed at a desired test location and the bottom of the drill bit and guide assembly 132 is placed in the main aperture of the baseplate 130 so that the key portions 132A and 130A engage each other. The assembly 130 is connected to a drill and the drill is activated to begin cutting. The drill bit 134 spins, creating a circular depression or groove 10A in a first material 10 to expose a second material 12 underneath, creating a middle portion or plug 10B. Finally, the shear force unit 102 is placed near the groove 10B so that the stationary jaw member 124A can engage a side surface of the portion 10B while the movable jaw member 114A can engage the side surface of the outer portion of the circular groove 10A (or vise-versa). Finally, the knob 108 of the shear force unit 102 is rotated so as to cause the movable jaw member 114A to move away from the stationary jaw member 124A to cause shear force between the top material layer 10 and the bottom material layer 12. The amount of force applied is then registered on the pressure gauge 104.

It may be desirable to calibrate the shear force unit 102. One approach to performing such a calibration is to place the unit 102 near an edge of a table, position pulleys near the table's edge, and then place a string or cable over the pulleys, round the movable jaw member 114A and attached to a weight of a known measurement along the side of the table. The knob 108 of the unit 102 is then turned, registering a value on the pressure gauge 104. This pressure gauge 104 can then be adjusted to display the value of the weight, thereby calibrating the pressure gauge 104 for the unit 102.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A portable shear testing device, comprising:
   a housing disposed on a base plate;
   a top bearing block disposed on a bottom bearing block and configured to move longitudinally within the housing;
   a digital load cell connected to the top bearing block;
   a first elongated jaw member connected to the top bearing block and positioned outside of the housing;
   a second elongated jaw member configured to remain stationary relative to the housing; and,
   a lever pivotally mounted within the housing and configured to apply various amounts of pressure on the digital load cell, depending on a position of the lever.

2. The portable shear testing device of claim 1, further comprising a knob having a threaded portion that is configured to screw into the housing and move a position of the lever.

3. The portable shear testing device of claim 1, further comprising a spring positioned under the lever to bias the lever to an upwards position.

4. The portable shear testing device of claim 1, wherein the top bearing block includes a plurality of bearings located in a groove extending therethrough, and wherein the bottom bearing block is shaped to move within the groove.

5. The portable shear testing device of claim 1, wherein the second elongated jaw member is connected to the base plate.

6. The portable shear testing device of claim 1, further comprising a pressure sensing device located outside of the housing and that is connected to the digital load sensor so as to display a pressure reading from the digital load sensor.

7. The portable shear testing device of claim 1, further comprising a drill guide having a drill shaft and drill bit configured to create a circular groove.

8. The portable shear testing device of claim 7, further comprising a guide plate having an aperture sized to accept the drill guide, the guide plate and drill guide each having a mating key shape configured to align the drill guide in one orientation within the guide plate.

9. A portable shear testing device, comprising:
   a top bearing block disposed on a bottom bearing block and configured to move longitudinally within the housing;
   a load cell connected to a side of the top bearing block;
   a first elongated jaw member connected to the top bearing block;
   a second elongated jaw member configured to remain stationary relative to the first elongated jaw member; and,
   a lever pivotally mounted adjacent to the load cell and configured to apply various amounts of pressure on the load cell, depending on a position of the lever, and thereby cause movement of the top bearing block.

10. The portable shear testing device of claim 9, further comprising a housing disposed around the lever, top bearing block, and bottom bearing block.

11. The portable shear testing device of claim 10, wherein the first elongated jaw member and the second elongated jaw member extend downwards from the housing.

12. The portable shear testing device of claim 11, further comprising a knob having a threaded portion that extends through the housing and contacts the lever, wherein rotation of the knob changes a position of the lever.

13. The portable shear testing device of claim 12, further comprising a pressure sensing device located outside of the housing and that is connected to the load sensor so as to display a pressure reading from the load sensor.

14. The portable shear testing device of claim 13, wherein the top bearing block includes a plurality of bearings located in a groove extending therethrough, and wherein the bottom bearing block is shaped to move within the groove.

15. A method of using a portable shear testing device, comprising:
   positioning a drill guide assembly on a first material;
   activating a drill to cause the drill guide assembly to create a circular groove in the first material to expose a second material underneath the first material;
   placing the portable shear testing device near the circular groove so that a first elongated jaw member and a second elongated jaw member each contact sides of the groove;
   activating the portable shear testing device to move the first elongated jaw member away from the second elongated jaw member; and,
   displaying a measurement from a load sensor in the portable shear testing device.

16. The method of claim 15, wherein the activating the portable shear testing device further comprises moving a lever to apply pressure to the load cell and a bearing block.

17. The method of claim 16, wherein the moving the lever includes rotating a knob to contact an end of the lever.

18. The method of claim 17, wherein the bearing block is positioned on a track member.

* * * * *